United States Patent
Yasumura

(10) Patent No.: US 6,192,363 B1
(45) Date of Patent: Feb. 20, 2001

(54) METHOD AND APPARATUS FOR SUPPLYING MULTI-MEDIA DATA TO A CLIENT BY USING THREADS

(75) Inventor: Yoshitaka Yasumura, Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/104,205

(22) Filed: Jun. 25, 1998

(30) Foreign Application Priority Data

Jun. 25, 1997 (JP) .................................................. 9-168303

(51) Int. Cl.$^7$ .................................................. G06F 17/30
(52) U.S. Cl. ................................. 707/10; 707/104; 707/2; 709/218
(58) Field of Search ........................... 707/1–4, 10, 104; 709/213, 217–219, 106–108, 200–203

(56) References Cited

U.S. PATENT DOCUMENTS

| | | | |
|---|---|---|---|
| 5,692,205 | 11/1997 | Berry et al. ........................... | 395/788 |
| 5,701,451 | 12/1997 | Rogers et al. ........................ | 395/600 |
| 5,754,772 | * 5/1998 | Leaf ...................................... | 709/213 |
| 6,052,710 | * 4/2000 | Saliba et al. .......................... | 709/203 |
| 6,084,584 | * 7/2000 | Nahi et al. ............................ | 345/329 |

FOREIGN PATENT DOCUMENTS

| | | |
|---|---|---|
| 3-102573 | 4/1991 | (JP) . |
| 7-182222 | 7/1995 | (JP) . |
| 7-200230 | 8/1995 | (JP) . |
| 8-166876 | 6/1996 | (JP) . |
| 9-114863 | 5/1997 | (JP) . |

OTHER PUBLICATIONS

"Providing access to a multimedia archive using the World Wide Web and an object–relational database management system," Dunlop et al., Computing & Control Engineering Journal, Oct., 1996, pp. 221–226.*

"A WWW interface to the OMNIS/Myriad literature retrieval engine," Clausnitzer et al., Computer Networks and ISDN Systems, vol. 27, No. 6, pp. 1–17–1026, Apr. 1995.*

"Informix's Illustra: Database for template–drive Web sites," McKenzie, M., Seybold Report on Internet Publishing, vol. 1, No. 1, pp. 90–98, Sep. 1996.*

"Caching of large database objects in Web servers," Jadav, D. et al., Proceedings of the 7th International Workshop on Research issues in Data Engineering, pp. 10–19, Apr. 1997.*

* cited by examiner

*Primary Examiner*—Hosain T. Alam
(74) *Attorney, Agent, or Firm*—Foley & Lardner

(57) ABSTRACT

There is provided a method of supplying multi-media data to a client through a network, including the steps of (a) requesting HTTP server to supply data to a client, (b) requesting a database server which is in communication with a plurality of database, to supply data to the HTTP server, (c) requesting a multi-media database storing multi-media data therein and correlating the multi-media data with one another, to supply the multi-media data to the database server, (d) requesting a template database storing template data, to supply the template data to the database server, (e) generating transmission data based on the multi-media data and the template data in the database server, and (f) transmitting the thus generated transmission data to the client through the HTTP server and a network. The above-mentioned method accomplishes data supplying service on a wide-area network through the use of WWW. By storing multi-media data and template data in the form of complex object, it would be possible to readily manage a lot of content data, and exchange content data without stopping supplying service.

21 Claims, 6 Drawing Sheets

```
<HTML>
  <HEAD>
    <TITLE>LION</TITLE>
  </HEAD>
  <BODY>
    <H1 ALIGN="CENTER">LION</H1>
    <%begindetail%>
      <IMG SRC="%lion.image%">
    <%enddetail%>
    <UL>
      <LI>HEIGHT:...., WEIGHT:....
      <LI>GABITAT:....
    </UL>
  </BODY>
</HTML>
```

METHOD AND APPARATUS FOR SUPPLYING MULTI-MEDIA DATA TO A CLIENT BY USING THREADS

BACKGROUND OF THE INVENTION

1. Field of the Invention

The invention relates to a database management system dealing with multi-media data, and more particularly to a system for managing multi-media data stored in a server, and making use of those multi-media data to supply service to a client in a multi-media data system in a wide-area network such as internet of which world wide web (WWW) is typical.

2. Description of the Related Art

Some of conventional systems dealing with multi-media data select object-oriented approach in order to unify representation of multi-media data having various forms.

For instance, Japanese Unexamined Patent Publication No. 7-200230 published on Aug. 4, 1995, which is based on the U.S. application Ser. No. 168721 filed on Dec. 16, 1993 and assigned to International Business Machines Corporation, has suggested a system in accordance with which it is possible for objects having various interfaces such as image and voice to respond in common message, but in different methods by virtue of object-oriented multi-phase.

FIG. 1 is a block diagram of the suggested system. The illustrated system includes a user input apparatus 1 to which a user gives inputs, a display 2 and an audio output 5 both supply outputs to a user, and a video-output 4 through which image data is displayed on the display 2. The user input apparatus 1, the display, the video-output 4, and the audio output 5 are all electrically connected to a central processing unit (CPU) 3 to thereby be controlled by CPU 3. CPU 3 is also electrically connected to a primary memory unit 6 and a secondary memory unit 7 for storing application programs therein.

Japanese Unexamined Patent Publication No. 3-102573 published on Apr. 26, 1991 has suggested an image processing system for displaying complicated images through the use of object-oriented database. Data of basic image objects is incorporated into complicated image objects, and is associated with a procedure of the basic image objects.

Japanese Unexamined Patent Publication No. 7-182222 has suggested an apparatus for managing an object-oriented database. The suggested apparatus extracts a logical correlation among a plurality of classes represented in object-oriented form, and carries out clustering in accordance with results of extraction.

Japanese Unexamined Patent Publication No. 8-166876 has suggested a method of supporting system development for facilitating system development based on object-oriented analysis design.

One of wide-area networks of which Internet is typical is World Wide Web (hereinafter, referred to simply as "WWW") which is a system for supplying common documents to many and unspecified or specified users. In WWW, a tagged document described with hypertext mark-up language (HTML) is distributed to users through WWW browser which is an application for representation, by making use of a simple communication protocol called HTTP (hypertext transfer protocol). HTML documents are identified by means of a uniform resource locator (URL). By making use of a tag, a link represented with URL may be embedded in a certain HTML document for leading a user to other HTML documents. By tracing such a link, a user can look at a plurality of documents. In these days, URL for images and voices may be designated in HTML document, and hence, images and voices can be regenerated as well as text documents on a screen of WWW browser.

FIG. 2 illustrates one of systems for making use of WWW in multi-media data supply service. The illustrated system is a general system wherein HTTP server operates in association with DB integration system on WWW server machine, and a system for managing a relational database is employed as a back end.

In order to designate data which a user wants to make access, WWW browser 10 transmits URL together with a parameter to HTTP server 20. Then, DB integration system 80 retrieves data from database 90 in accordance with the parameter received in HTTP server 20, and generates HTML document in accordance with a template supplied from a template file 81. The thus generated HTML document is returned to WWW browser 10. Multi-media data such as images 21 and voices 22, and an applet 23 which is a program operable on WWW browser are held as ordinary files. The database 90 manages only names or URL of the files.

In accordance with such conventional systems dealing with multi-media data as mentioned above, all terminals of users have to include a component for transmitting output to and receiving input from a system dealing with multi-media data. Thus, it would be difficult for the conventional systems to distribute multi-media data to many and unspecified users.

This problem can be solved by a system making use of WWW to distribute multi-media data to users, because what is requested to users is just to have a terminal in which some WWW browsers are installed. However, in a conventional system making use of WWW to distribute multi-media data to users, what is stored in a database as data is only letters and figures. Multi-media data is stored in a separate file. Accordingly, as the system becomes larger in a size, it would become quite complicated to manage contents.

In addition, when HTML documents are to be dynamically generated, results of retrieving data from database are merely embedded into HTML documents in the conventional system. If procedures to do are complicated even slightly, script language or programming language has to be used.

SUMMARY OF THE INVENTION

In view of the foregoing problems, it is an object of the present invention to provide a system which makes use of an outline of WWW capable of providing service in a wide-area network, to thereby efficiently store multi-media data in a database, and effectively supply multi-media data to users.

In one aspect, there is provided a method of supplying multi-media data to a client through a network, including the steps of (a) requesting HTTP server to supply data to a client, (b) requesting a database server which is in communication with a plurality of database, to supply data to the HTTP server, (c) requesting a multi-media database storing multi-media data therein and correlating the multi-media data with one another, to supply the multi-media data to the database server, (d) requesting a template database storing template data, to supply the template data to the database server, (e) generating transmission data based on the multi-media data and the template data in the database server, and (f) transmitting the thus generated transmission data to the client through the HTTP server and a network.

In this method, the steps (c) and (d) may be concurrently carried out.

There is further provided a method of supplying multi-media data to a client through a network, including the steps of (a) supplying HTTP server with URL and a parameter as an access request from a client, (b) determining whether the access request is in the process of a session, (c) acquiring or making a thread, (d) carrying out an access method stored in a database access module indicated by the URL, on the thread, (e) making access to a multi-media database to acquire data, (f) generating, on acquiring all data, an entry point required for making an output document, and registering the thus generated entry point in an entry table, (g) generating HTML document in accordance with an associated template stored in a template database, and (h) returning the thus generated HTML document to the client through the HTTP server.

It is preferable that the following steps are carried out between the steps (b) and (c), if the access request is not in the process of a session in the step (b): (b-1) beginning a session, and (b-2) confirming that the number of a thread is not a maximum.

The above-mentioned method may further include the steps of (d-1) determining whether there is a processing characteristic to the multi-media data, and (d-2) if any in the step (d-1), requesting an external multi-media class library to carry out the processing. These steps (d-1) and (d-2) are to be carried out between the steps (d) and (e).

It is preferable that the step (g) includes the steps of (g-1) turning an uppermost grade object to a current object, (g-2) determining whether there is a lower grade collection than the current object, (g-3) generating a text of a partial document, if there is no lower grade collection in the step (g-2), (g-4) determining whether there is an upper grade object than the current object, and (g-5) returning the partial document as an output document, if there is no upper grade object in the step (g-4).

It is preferable that the following steps are carried out subsequently to the step (g-2), if there is a lower grade collection in the step (g-2): (g-21) detecting objects residual in a collection, and (g-22) turning the thus detected objects to a current object, and then returning to the step (g-2). It is preferable that if no objects are detected residual in a collection in the step (g-21), there is generated a text from all partial documents in the collection as a partial document of the current object.

It is preferable that if there is an upper grade object than the current object in the step (g-4), the following steps are carried out subsequently to the step (g-4): (g-41) turning the upper grade object to a current object, and (g-42) returning to the step (g-21).

In another aspect of the present invention, there is provided a multi-media data server supplying multi-media data to a client through a network, including (a) a multi-media database storing multi-media data and correlating the multi-media data with one another, (b) a template database storing template data representing an arrangement of the multi-media data when displayed on a screen, and (c) a database server receiving the multi-media data and the template data from the multi-media database and the template database, and generating data requested by a client, based on the thus received multi-media data and template data.

The above-mentioned multi-media data server may further include a database access module including a plurality of database access methods and making access to the multi-media database through the database access methods, and/or a multi-media class library through which the database access module makes access to the multi-media database.

The database server may be designed to include (a) a HTTP server interface section making communication with a server to which a client requests to supply data thereto, (b) a thread for processing an access request transmitted through the HTTP server interface section from the client, and (c) a thread control section for controlling an operation of the thread.

The multi-media data server may include a plurality of threads, in which case, it is preferable that the multi-media data server further includes a dispatch section for assigning the access request processing to each of the threads.

The database access module may be designed to include (a) a plurality of methods associated with each of threads included in the database server, and (b) an entry table through which the database access module transmits data to and receives data from the database server.

In still another aspect of the present invention, there is provided a recording medium readable by a computer and storing therein a multi-media data server program to be executed by a server computer for supplying multi-media data to a client computer through a network, the multi-media data server program causing the server computer to execute the following processing: (a) MMDB processing for employing a multi-media database storing the multi-media data therein and correlating the multi-media data with one another, (b) a template DB processing for employing a template database storing therein template data representing an arrangement of the multi-media data when displayed on a screen, and (c) a database server processing including a thread execution processing and a thread control processing. The thread execution processing includes (a) receiving the multi-media data and the template data from the multi-media database and the template database, and (b) generating data requested by the client computer, based on the thus received multi-media data and template data. The thread control processing includes managing and controlling at least one thread.

It is preferable that the multi-media data server program causes the server computer to further execute a database access module which includes a plurality of database access methods having a common interface with the thread, and makes access to the multi-media database though the database access methods, and wherein an access request to the multi-media database is made to the MMDB processing through the database access module in the database server processing.

It is preferable that the thread execution processing is executed by a plurality of threads, and that the thread control processing includes managing and controlling the threads.

It is preferable that the MMDB processing and the template DB processing include a processing of decomposing the multi-media data and the template data into complex objects and storing the thus decomposed data therein, and wherein the thread execution processing includes a processing of arranging an image to be displayed for a client, based on elementary data constituting elements of the complex objects.

In yet another aspect of the present invention, there is provided a system for supplying multi-media data to a client through a network, including (a) an apparatus for storing multi-media data and template data in the form of a complex object, and (b) an apparatus for converting the complex object to such data that the object can be displayed to a client through a viewer of the client.

The system may further include (c) an apparatus for providing a plurality of data access methods, (d) multi-threads for executing an access request transmitted from a client, (e) an apparatus for managing and controlling the multi-threads, (f) an apparatus for decomposing template data into elementary data, and analyzing the elementary data, and (g) an apparatus for converting the elementary data, generating a document containing the thus converted elementary data therein, and returning the document to the client.

The above-mentioned present invention accomplishes data supplying service on a wide-area network through the use of WWW. By storing multi-media data and template data in the form of complex object, it would be possible to readily manage a lot of content data, and exchange content data without stopping supplying service.

With respect to the database access, a plurality of access to multi-media data is provided, and hence, an application developer can develop an application with any method for making access to a database, such as inquiry language and programming language. It would be also possible to make use of an external library such as a multi-media class library and a tool through API provided by them.

It is now possible to conduct access-control for every user and site by decomposing template data into elements, and storing them in a database.

Thus, in accordance with the present invention, it is possible to supply multi-media data to users in a common outline defined by WWW. Since multi-media data and template data are all stored in a database, a server manager would readily manage contents, and convert multi-media data into an output document for representing to users.

In addition, since the multi-media data server in accordance with the present invention provides a common interface by separating the database access module from other components, a system developer could use any access methods or any programming languages, which ensures increased options to a system developer. Multi-threads may be used in order to respond to access requests transmitted from a plurality of users, which ensures that a response time can be shortened.

In the present invention, multi-media data and template data are decomposed into elementary data, and the elementary data is stored in a database as a complex object. Hence, it is possible to conduct access-control for every user and site for each of the elementary data. It is no longer necessary to analyze a description stored in template data for making access t database, when the description is to be extracted.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
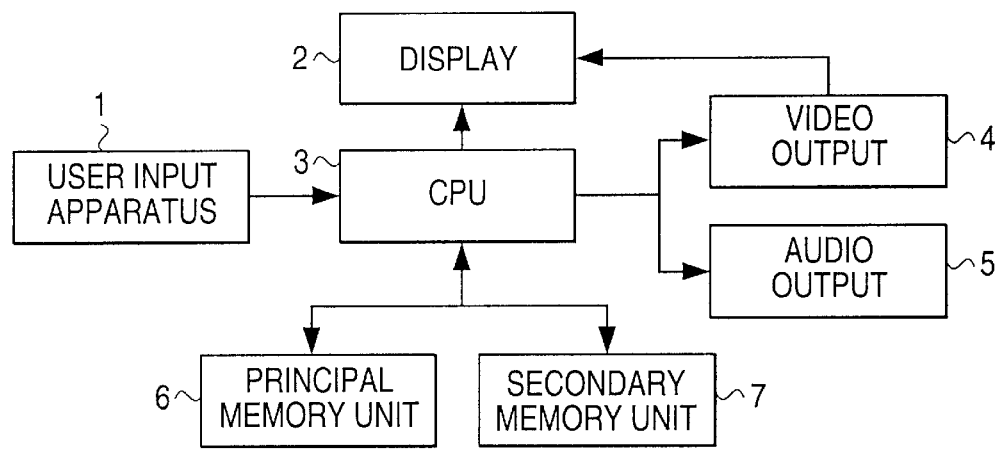
FIG. 1 is a block diagram of a conventional user interface adopting an object-oriented approach.
Figure 2:
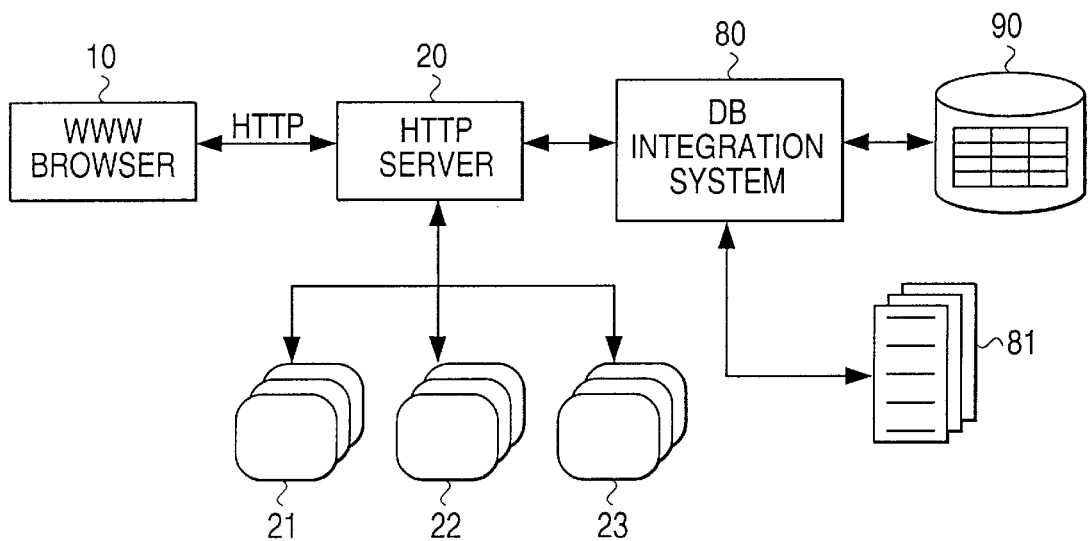
FIG. 2 is a block diagram of a conventional WWW-DB integration system for supplying multi-media data.
Figure 3:
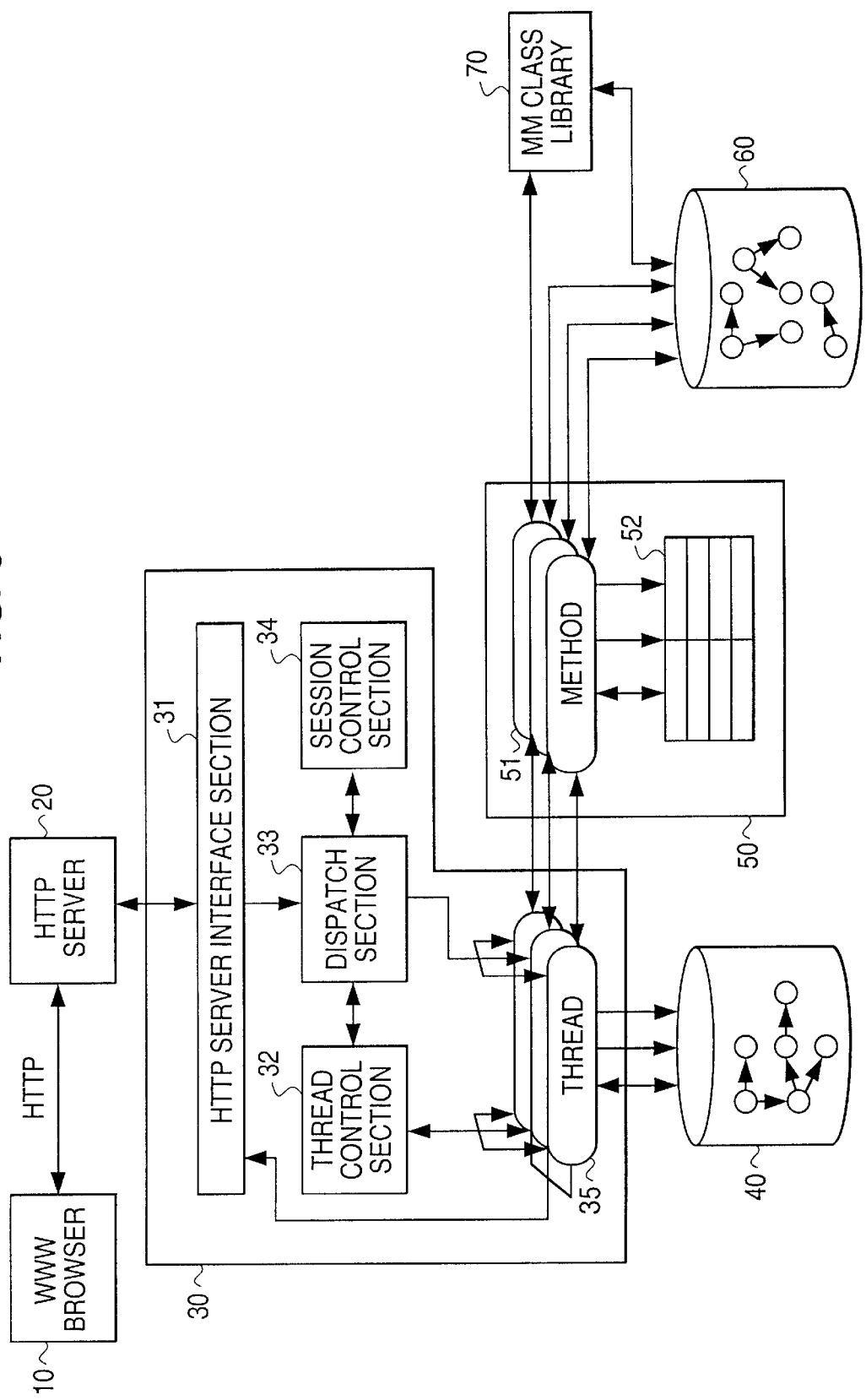
FIG. 3 is a block diagram of a system for supplying multi-media data to users in accordance with the embodiment of the present invention.

FIG. 3 is a block diagram illustrating a system for supplying multi-media data to users in accordance with a preferred embodiment of the present invention. Now suppose that a user or client makes communication with a server through WWW browser 10. As illustrated in FIG. 3, the server includes HTTP server 20, a database server 30, a template database 40, a database access module 50, a multi-media database 60, and MM class library 70.

Each of client terminals has WWW browser 10, which makes communication with HTTP server 20 under HTTP protocol. The database server 30 operates in association with HTTP server 20, and produces HTML document to be returned to the client, in accordance with a template stored in the template database 40. The database server 30 operates further in association with the database access module 50 which makes access to the multi-media database 60. Access may be made to the multi-media database 60 through the multi-media class library 70.

As illustrated in FIG. 3, the database server 30 is comprised of a plurality of threads 35 for dealing with access requests transmitted from the client through HTTP server 20, HTTP server interface section 31 making communication with HTTP sever 20 through API provided from HTTP server 20, a thread control section 32 for controlling an operation of the threads 35, a dispatch section 33 for assigning the access requests to each of the threads 35, and a session control section 34 for accomplishing a sequence of access to the databases.

The database access module 50 is comprised of a plurality of methods 51 each associated with each of threads 35 included in the database server 30, and an entry table 52 through the database access module 50 transmits data to and receives data from the database server 30.

Hereinafter is explained a relation between the database server 30 and the database access module 50, with reference to FIG. 4. An access request designated by a user constitutes database connection information 101. The database access connection information 101 contains information about a database access method 102 and a template 103 associated with the database connection information 101. Hence, only one database access method to be carried out to an access request and only one template for generating an output document are determined. A combination of a database access method and a template can be freely varied. In order to transmit to a template 103 multi-media data obtained by the database access method 102, an entry point defined in the database access method 102 is registered in an entry table 104. The thread 35 associated with the database access method 102, which deals with the template 103, generates an output document, referring to the registered entry point.

Figures 4, 5:
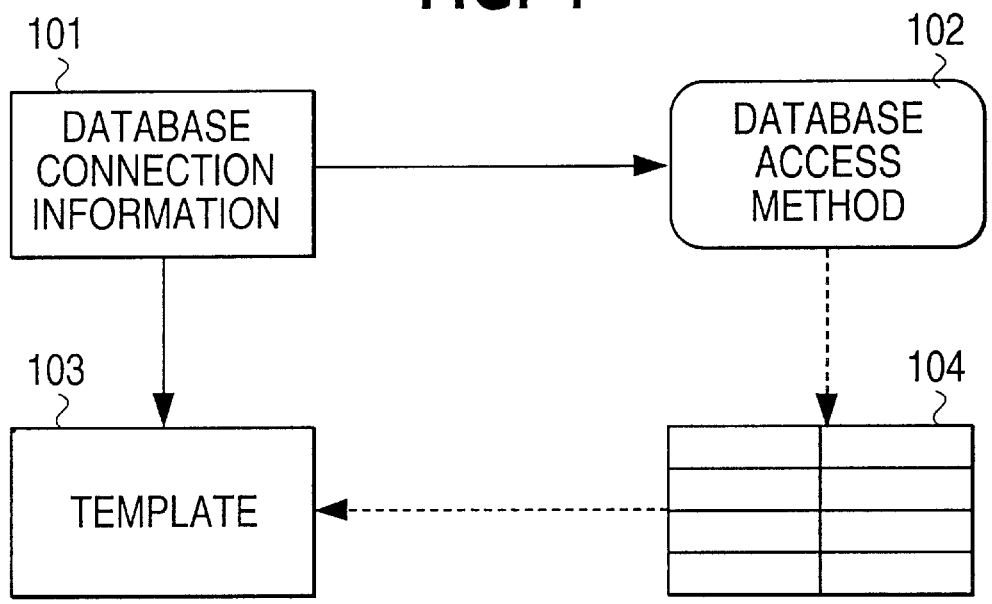
FIG. 4 is a block diagram illustrating a relation between a database access method and a template.
FIG. 5 illustrates an example of a template.

FIG. 5 illustrates an example of templates. As illustrated, a template in accordance with the present embodiment is made in the form of HTML document, and adds a description thereto for embedding therein data obtained by database access.

Figure 6:
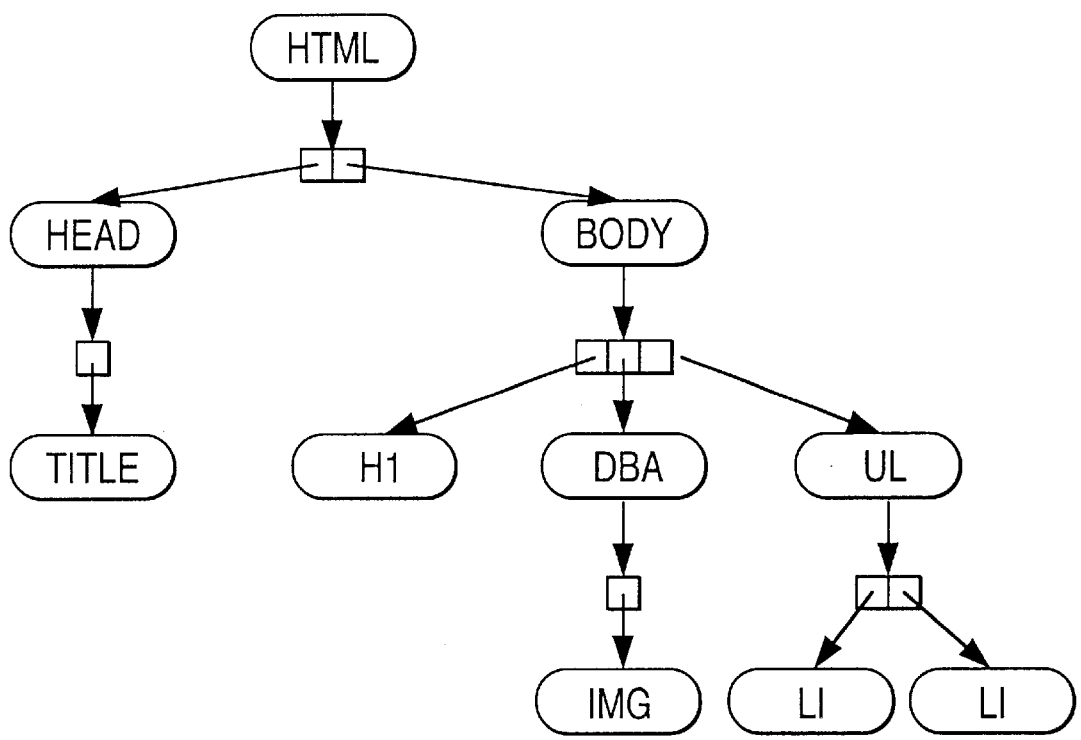
FIG. 6 is a block diagram of a database in which a template is stored.

FIG. 6 is a block diagram where the template illustrated in FIG. 5 is stored in the template database 40 by making use of complex objects of an object-oriented database. Each of tags of HTML documents is associated with an object, and their inclusion relation is represented with a set. A portion sandwiched between <% begindetail %> and <% enddetail %> in the template illustrated in FIG. 5 is handled as a tag called DBA. Attributes contained in each of the tags, such as ALIGN attribute defined in H1 tag in FIG. 5, are registered as attributes of each of tag objects or as member parameter.

Hereinafter is explained an operation of the system for supplying multi-media data to users, in accordance with the present embodiment, with reference to FIGS. 3 and 7.

Figure 7:
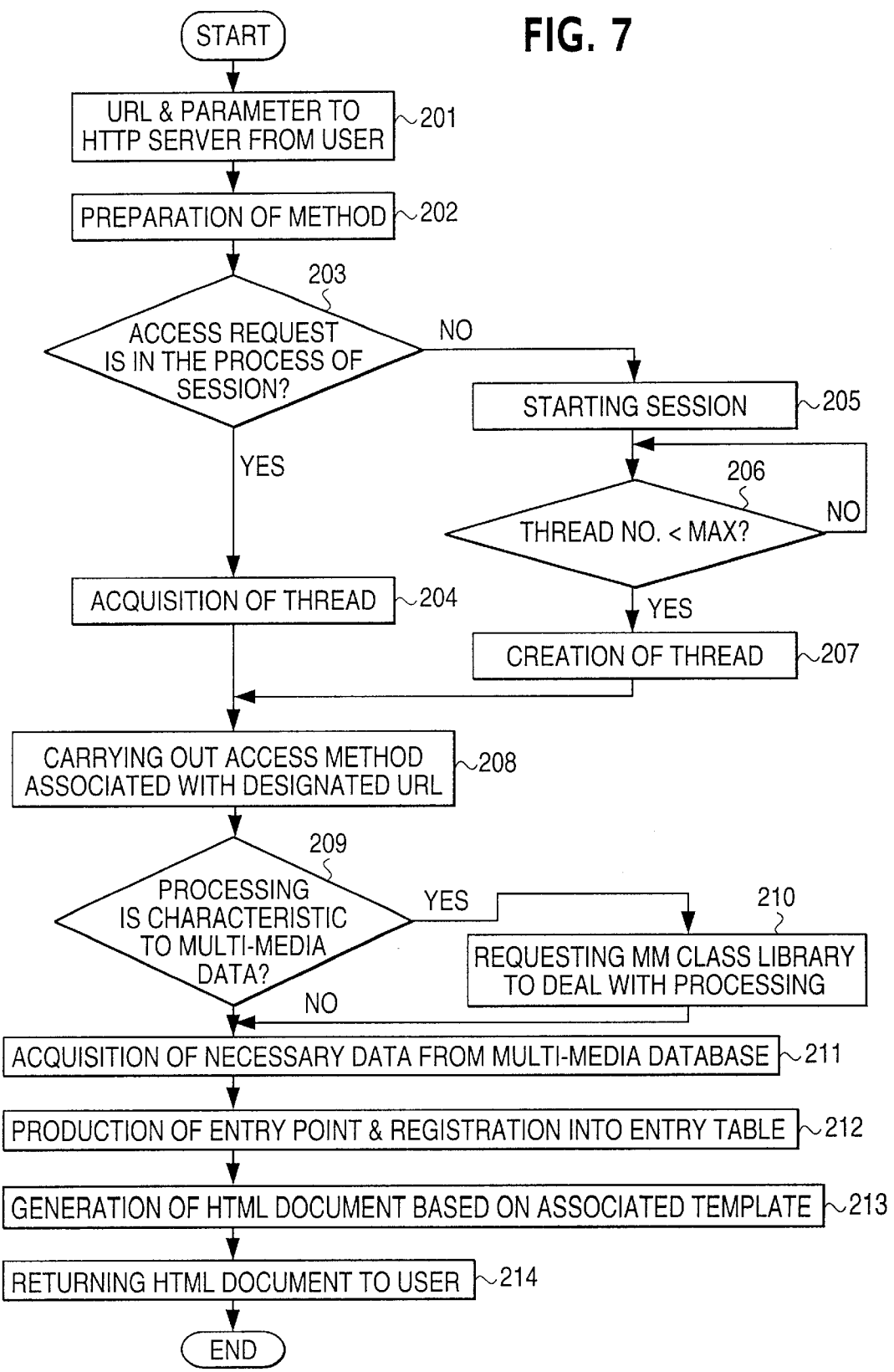
FIG. 7 is a flow chart of a procedure of supplying multi-media data to users.

With reference to FIG. 7, URL and a parameter as an access request of a user is transmitted to HTTP server 20 from WWW browser 10 in step 201. URL and a parameter are transmitted to HTTP server interface section 31 of the database server 30, and then are controlled in the dispatch section 33 in step 202. In step 203, the dispatch section 33 judges as to whether an access request handled now is in the process of a session, referring to the session control section 34.

If the access request is judged in the process of a session, a thread is acquired in step 204. If the access request is judged not in the process of a session, a session is started in step 205, and then, it is confirmed as to whether the number of threads is a maximum in step 206. Thereafter, a thread is made in step 207. Then, in step 208, an access method 51 in the database access module 50 associated with database connection information designated wit URL is carried out on the thus acquired or made thread 35.

Then, in step 209, it is judged as to whether there is a processing characteristic to multi-media data in the database access method 51. If any, an external multi-media class library is requested to deal with the processing in step 210. In order to deal with processing other than processing characteristic to multi-media data, the database access method 51 makes direct access to the multi-media database 60 to thereby acquire necessary data in step 211. When the database access method 51 has acquired all data, an entry point necessary for production of an output document is generated, and then registered in the entry table 52 in step 212.

Then, a control is returned to the thread 35 from the database access method 51, and, in step 213, there is generated HTML document based on an associated template stored in the template database 40. At the same time, data necessary for generating HTML document is acquired by referring to the entry table 52. Finally, in step 214, the thus generated HTML document is returned to WWW browser 10 through HTTP server 20.

Hereinbelow is explained a procedure of generating HTML document by making use of a template stored in the template database 40 and developed into a complex object.

Figure 8:
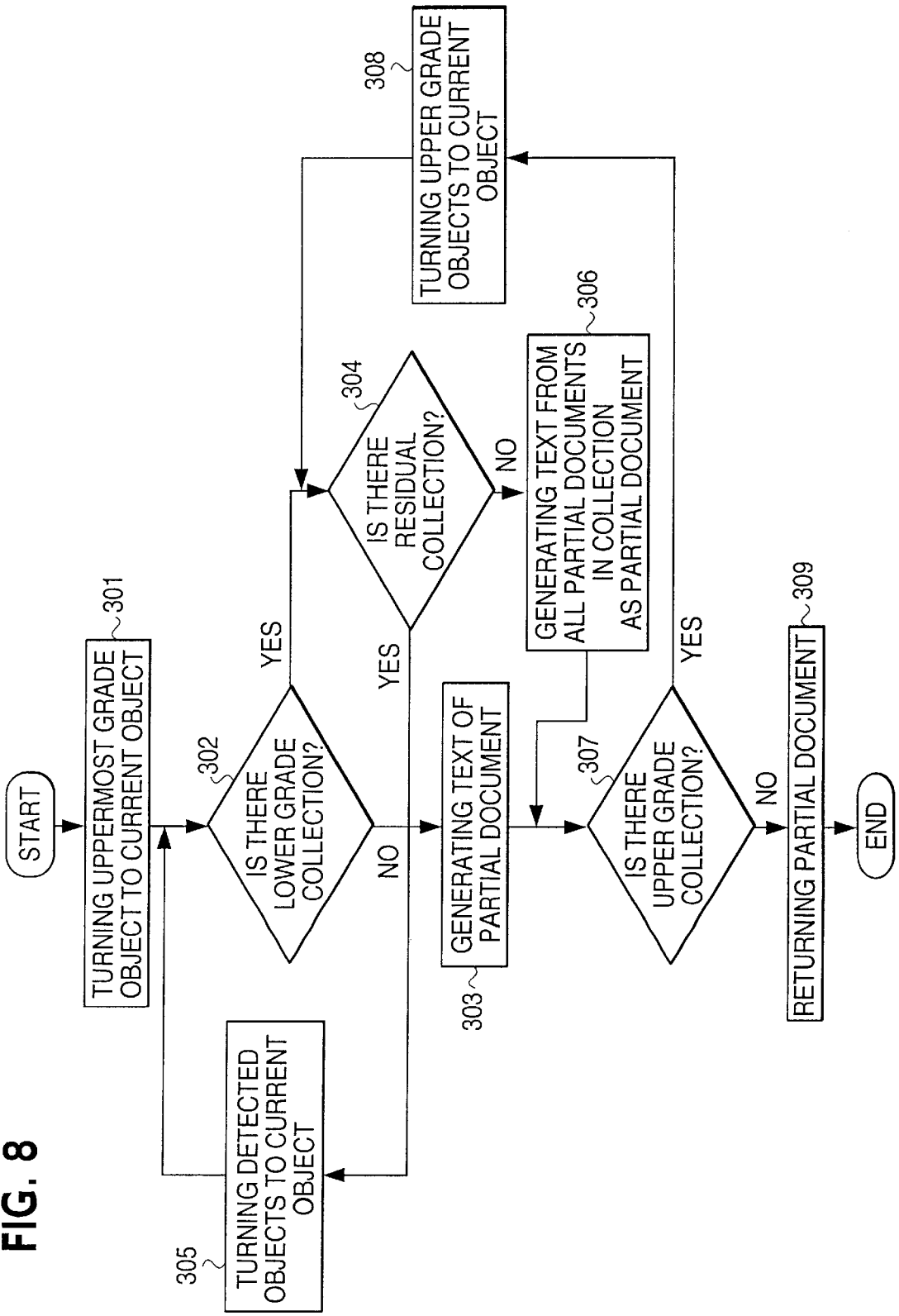
FIG. 8 is a flow chart of a procedure of generating HTML document.

With reference to FIG. 8, an uppermost grade object or HTML-tagged object is turned into a current object in step 301. Herein, a current object is an object having a control for a processing therein.

Then, in step 302, it is judged as to whether there is a lower grade collection than the current object. If there is no lower grade collection, there is generated a text of a partial document in step 303. If there is a lower grade collection, all objects residual in the lower grade collection are detected in step 304, and then, the thus detected objects are turned into a current object in step 305. Then, the step 302 is repeated again.

If no objects are detected residual in the lower grade collection in the step 304, there is generated a text from all partial documents in the collection as a partial document of the current object in step 306.

Then, in step 307, it is judged as to whether there is an upper grade object than the current object. If there is an upper grade object than the current object in step 307, the upper grade object is turned into a current object in step 308, and the step 304 is repeated again. If there is no upper grade object than the current object in step 307, that is, if there exists only an uppermost grade object, a partial document of the current object is returned as an output document in step 309. Thus, a cycle of the procedure is finished.

A multi-media data server program to be executed by a server computer for carrying out the above-mentioned procedure to operate the system for supplying multi-media data to users through a network may be stored in a recording medium readable by a computer, such as a floppy disc, a hard disc and a magnetic tape and the like.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-168303 filed on Jun. 25, 1997 including specification, claims, drawings and summary is incorporated herein by reference in its entirety.

What is claimed is:

1. A method of supplying multi-media data to a client through a network, comprising the steps of:

(a) requesting HTTP server to supply data to a client;

(b) making communication, via a HTTP server interface section, with a server to which the client requests to supply data thereto;

(c) processing, via a thread, an access request transmitted through said HTTP server interface section from said client;

(d) requesting a database server which is in communication with a plurality of databases, to supply data to said HTTP server;

(e) requesting a multi-media database storing multi-media data therein and correlating said multi-media data with one another, to supply said multi-media data to said database server;

(f) requesting a template database storing template data, to supply said template data to said database server;

(g) generating transmission data based on said multi-media data and said template data in said database server; and (h) transmitting the thus generated transmission data to said client through said HTTP server and a network.

2. The method as set forth in claim 1, wherein said steps (e) and (f) are concurrently carried out.

3. A method of supplying multi-media data to a client through a network, comprising the steps of:

(a) supplying HTTP server with URL and a parameter as an access request from a client;

(b) determining whether said access request is in the process of a session;

(c) acquiring or making a thread;

(d) carrying out an access method stored in a database access module indicated by said URL, on said thread;

(e) making access to a multi-media database to acquire data;

(f) generating, on acquiring all data, an entry point required for making an output document, and registering the thus generated entry point in an entry table;

(g) generating HTML document in accordance with an associated template stored in a template database; and (h) returning the thus generated HTML document to said client through said HTTP server.

4. The method as set forth in claim 3, wherein if said access request is not in the process of a session in said step (b), the following steps are carried out between said steps (b) and (c):

(b-1) commencing a session; and (b-2) confirming that the number of a thread is not a maximum.

5. The method as set forth in claim 3, further comprising the steps of:

(d-1) determining whether there is a processing characteristic to said multi-media data; and (d-2) if any in said step (d-1), requesting an external multi-media class library to carry out said processing, said steps (d-1) and (d-2) being to be carried out between said steps (d) and (e).

6. The method as set forth in claim 3, wherein said step (g) includes the steps of:

(g-1) turning an uppermost grade object to a current object;

(g-2) determining whether there is a lower grade collection than said current object;

(g-3) generating a text of a partial document, if there is no lower grade collection in said step (g-2);

(g-4) determining whether there is an upper grade object than said current object; and (g-5) returning said partial document as an output document, if there is no upper grade object in said step (g-4).

7. The method as set forth in claim 6, wherein if there is a lower grade collection in said step (g-2), the following steps are carried out subsequently to said step (g-2):

(g-21) detecting objects residual in a collection; and (g-22) turning the thus detected objects to a current object, and then returning to said step (g-2).

8. The method as set forth in claim 7, wherein if no objects are detected residual in a collection in said step (g-21), there is generated a text from all partial documents in said collection as a partial document of said current object.

9. The method as set forth in claim 7, wherein if there is an upper grade object than said current object in said step (g-4), the following steps are carried out subsequently to said step (g-4):

(g-41) turning the upper grade object to a current object; and (g-42) returning to said step (g-21).

10. A multi-media data server supplying multi-media data to a client through a network, comprising:

(a) a HTTP server interface section making communication with a server to which a client requests to supply data thereto;

(b) a thread for processing an access request transmitted through said HTTP server interface section from said client;

(c) a multi-media database storing multi-media data and correlating said multi-media data with one another;

(d) a template database storing template data representing an arrangement of said multi-media data when displayed on a screen; and (e) a database server receiving said multi-media data and said template data from said multi-media database and said template database, and generating data requested by a client, based on the thus received multi-media data and template data.

11. The multi-media data server as set forth in claim 10, further comprising a database access module including a plurality of database access methods and making access to said multi-media database through said database access methods.

12. The multi-media data server as set forth in claim 11, further comprising a multi-media class library through which said database access module makes access to said multi-media database.

13. The multi-media data server as set forth in claim 10, wherein said database server includes:

a thread control section for controlling an operation of said thread.

14. The multi-media data server as set forth in claim 13, wherein said multi-media data server includes a plurality of threads, and further comprising (d) a dispatch section for assigning said access request processing to each of said threads.

15. The multi-media data server as set forth in claim 11, wherein said database access module comprises:

(a) a plurality of methods associated with a plurality of threads included in said database server; and (b) an entry table through which said database access module transmits data to and receives data from said database server.

16. A recording medium readable by a computer and storing therein a multi-media data server program to be executed by a server computer for supplying multi-media data to a client computer through a network, said multi-media data server program causing said server computer to execute the following processing:

(a) multi-media database (MMDB) processing for employing a multi-media database storing said multi-media data therein and correlating said multi-media data with one another;

(b) a template database (DB) processing for employing a template database storing therein template data representing an arrangement of said multi-media data when displayed on a screen; and (c) a database server processing including a thread execution processing and a thread control processing, said thread execution processing including:

receiving said multi-media data and said template data from said multi-media database and said template database, and generating data requested by said client computer, based on the thus received multi-media data and template data, said thread control processing including:

managing and controlling at least one thread.

17. The recording medium as set forth in claim 16, wherein said multi-media data server program causes said server computer to further execute a database access module which includes a plurality of database access methods having a common interface with said thread, and makes access to said multi-media database though said database access methods, and wherein an access request to said multi-media database is made to said MMDB processing through said database access module in said database server processing.

18. The recording medium as set forth in claim 17, wherein said thread execution processing is executed by a plurality of threads, and wherein said thread control processing includes managing and controlling said threads.

19. The recording medium as set forth in claim 16, wherein said MMDB processing and said template DB processing include a processing of decomposing said multi-media data and said template data into complex objects and storing the thus decomposed data therein, and wherein said thread execution processing includes a processing of arranging an image to be displayed for a client, based on elementary data constituting elements of said complex objects.

20. A system for supplying multi-media data to a client through a network, comprising:

(a) means for storing multi-media data and template data in the form of a complex object;

(b) means for converting said complex object to such data that said object can be displayed to a client through a viewer of said client; and (c) multi-threads for executing an access request transmitted from a client.

21. The system as set forth in claim 20, further comprising:

(d) means for providing a plurality of data access methods;

(e) means for managing and controlling said multi-threads;

(f) means for decomposing template data into elementary data, and analyzing said elementary data; and (g) means for converting said elementary data, generating a document containing the thus converted elementary data therein, and returning said document to said client.

* * * * *